United States Patent [19]

Baldwin

[11] 3,774,764
[45] Nov. 27, 1973

[54] DISPOSABLE SPIN-ON TYPE OIL FILTERS

[75] Inventor: Jesse A. Baldwin, Kearney, Nebr.

[73] Assignee: J. A. Baldwin Manufacturing Company, Kearney, Nebr.

[22] Filed: Mar. 5, 1971

[21] Appl. No.: 121,367

[52] U.S. Cl. .............................. 210/130, 210/136
[51] Int. Cl. ............................................. B01d 27/00
[58] Field of Search .................... 210/130, 134, 136, 210/440, 443 T

[56] References Cited
UNITED STATES PATENTS

| | | | |
|---|---|---|---|
| 3,473,664 | 10/1969 | Hultgren | 210/130 |
| 3,557,958 | 1/1971 | Baldwin | 210/136 |
| 3,567,022 | 3/1971 | Thornton et al. | 210/130 |

FOREIGN PATENTS OR APPLICATIONS

| | | | |
|---|---|---|---|
| 683,247 | 3/1964 | Canada | 210/130 |
| 904,320 | 8/1962 | Great Britain | 210/130 |

*Primary Examiner*—Frank A. Spear, Jr.
*Attorney*—J. Harold Kilcoyne

[57] ABSTRACT

A disposable spin-on type oil filter incorporating an improved front-end bypass valve unit (also providing an annular seat for the filter element) characterized in that the valve element thereof comprises a planar annulus of rubber or rubber-like material having radial width substantially equal to the radial width of the adapter-bushing flange, and being disposed thereon and positively secured thereto along the full outer periphery of both, whereby the valve annulus in partaking of its seating and unseating movements merely flexes about its secured outer edge line. Combined with said front end bypass valve is an anti-drainback valve which preferably is fashioned as a rubber or rubber-like preform having the general configuration of an upright truncated cone and which is secured along its smaller-diameter end portion to the filter-element at about the junction of its bottom end cap and center tube by said bypass valve unit and which extends downwardly and outwardly therefrom by an amount such that its outer edge portion overhangs a complementally inclined sloped-surface provided on the inner surface of the filter base plate and presses against same.

4 Claims, 7 Drawing Figures

PATENTED NOV 27 1973 3,774,764
Fig. 1.
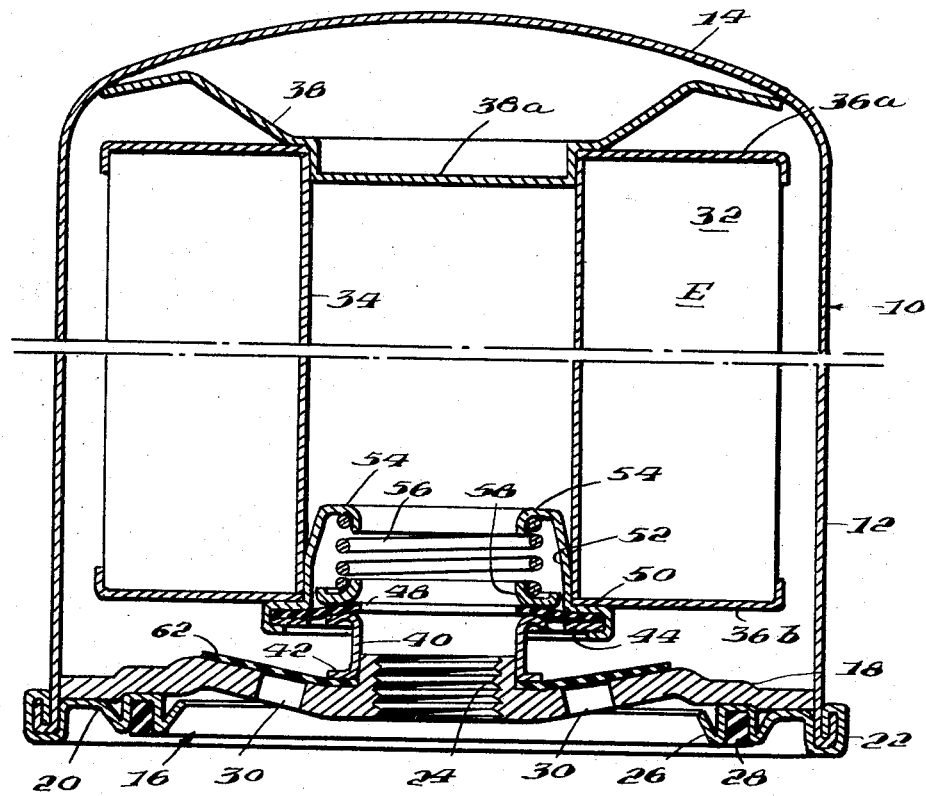
Fig. 3.
Fig. 2.
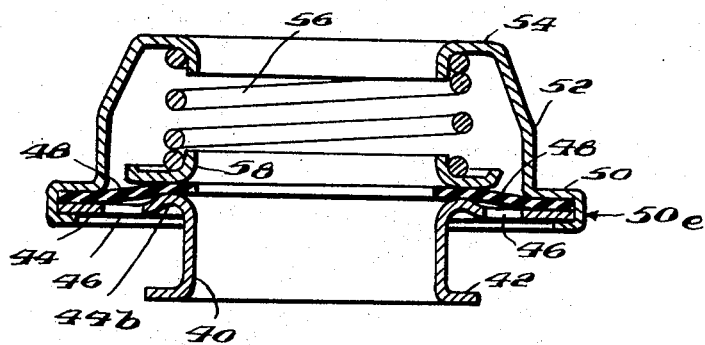
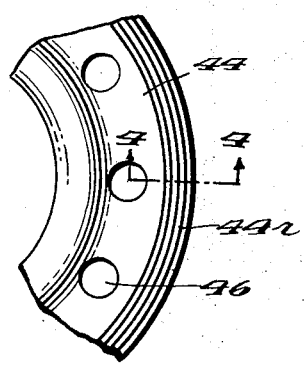
Fig. 4.
INVENTOR
JESSE A. BALDWIN,
BY  Harold Kilcoyne,
ATTORNEY

INVENTOR.
JESSE A. BALDWIN,
ATTORNEY

DISPOSABLE SPIN-ON TYPE OIL FILTERS

INTRODUCTION

This invention relates to improvements in liquid filters and particularly, although not exclusively, in oil filters of the so-called disposable spin-on type for use in filtering out contaminants usually present in the lubricating oil being supplied to the bearings and/or other parts of an automotive engine requiring lubrication, under the pressure developed by an engine-driven oil pump. More specifically, the invention is concerned with the provision of an oil filter as aforesaid incorporating an improved front- or bottom-end bypass valve which opens to permit the incoming oil to bypass the filter element of the filter when such becomes clogged by dirt particles, etc. to a degree that normal oil flow therethrough is unduly restricted, and yet more particularly, with the provision of an oil filter which combines with its basic disposable spin-on structure both an improved front- or bottom-end bypass valve as aforesaid and an anti-drainback valve serving to prevent oil which has entered the filter housing from draining back into the oil line when the engine is stopped and the oil pump which is normally driven from said engine is thereby cut out of operation.

BACKGROUND OF THE INVENTION

As explained in my earlier application for letters patent Ser. No. 1,238, filed Jan. 7, 1970, entitled "Oil Filters with Front-End Bypass Valve," now U.S. Pat. No. 3,608,724 dated Sept. 28, 1971 the available makes of disposable spin-on type oil filters having a front- or bottom-end bypass valve, as distinguished from such filters employing the more conventional upper- (or distal) end bypass valve, fail in certain respects to satisfy fully the requirements of a commercially practical full-flow spin-on filter, among which may be noted (a) that of the capability of the bypass valve thereof, when bypassing oil around the filter element, to provide maximum oil flow therethrough from a given pressure available from the engine-driven oil pump (which requirement can be achieved only by a bypass valve of a design imposing minimum restriction to oil flow therethrough for a given size); and (b) that of the high-flow bypass valve being senitive to a predetermined pressure increase within the filter housing and which at the same time can be economically manufactured.

It is also explained that prior attempts to devise a practical and economical disposable spin-on type filter which combines in an effective and commercially acceptable manner a front-end bypass valve and an anti-drainback valve, the latter operating much as a one-way check valve in preventing oil then in transit through the filter housing from draining back into the oil line when the engine is stopped and the oil pump is correspondingly cut out of operation, have not met with unqualified success. The reason therefor will, it is believed, be found in the fact that the anti-drainback valve employed in the combination took either one of two structural forms as follows: (1) that of an annulus of thin sheet rubber or rubber-like material which is secured along its inner edge only to the upper (inner) surface of the heavy-gauge base plate of the closure-plate assembly and whose unsecured outer-edge portion is designed normally to seat flush against the usually planar surface portion of said base plate in which the oil inlet openings to the filter interior are provided, thus to prevent back-flow through said openings when the engine-driven oil pump is cut out of operation but which seating with prevention of oil back-flow does not always take place as the unsecured outer portion of the thin rubber annulus does not seat and unseat with certainty; or (2) that of an upright truncated cone of resilient rubber or rubber-like material which is secured along its smaller-diameter edge portion so that it engages with line contact only along its outer or larger-diameter edge on a similarly planar, upper (inner) surface portion of the base plate, with the full operability of the coned edge-portion requiring built-in reinforcement or separate internal support provided by spring-metal fingers, for example, the inclusion of either of which adds materially to the production costs of the filter. Thus, in the one case, the operation of the combination front-end bypass and anti-drainback valve is rendered uncertain due to the uncertainty of operation of the anti-drainback valve component thereof; and in the other case, the combination front-end bypass and anti-drainback valve is rendered so very costly that the incorporation thereof in a filter of the disposable or throwaway type becomes questionably practical.

OBJECTS OF THE INVENTION

Stated broadly, the invention contemplates and aims to provide an oil filter of the disposable spin-on type incorporating an improved front- or bottom-end bypass valve whose construction and mode of operation are such as to provide maximum oil-flow around the filter element consistent with practical design and economy-in-manufacture requirements, when the normal oil-flow path becomes unduly restricted due to the filter element being clogged.

In another of its aspects, the invention contemplates and aims to provide an oil filter of the disposable spin-on type which incorporates into its basic filter structure, in manner as to act in combination therewith and with one another, both an improved and efficient front-end bypass valve and a novel anti-drainback valve arrangement, wherein the anti-drainback valve element comprises a preform of rubber or rubber-like material configured as an upright truncated cone which is secured along its smaller-diameter end in position such that it normally engages along its larger-diameter under-edge portion against a correspondingly inclined or sloped base-plate surface but which surface has slightly larger diameter than that of said under-edge portion of said preform, whereby said preform tends normally to "hug" said inclined base-plate surface throughout its full circumference, as distinguished from merely making line contact against a flat or plane surface of said base plate.

DETAILED DESCRIPTION OF THE INVENTION

Figure 5:
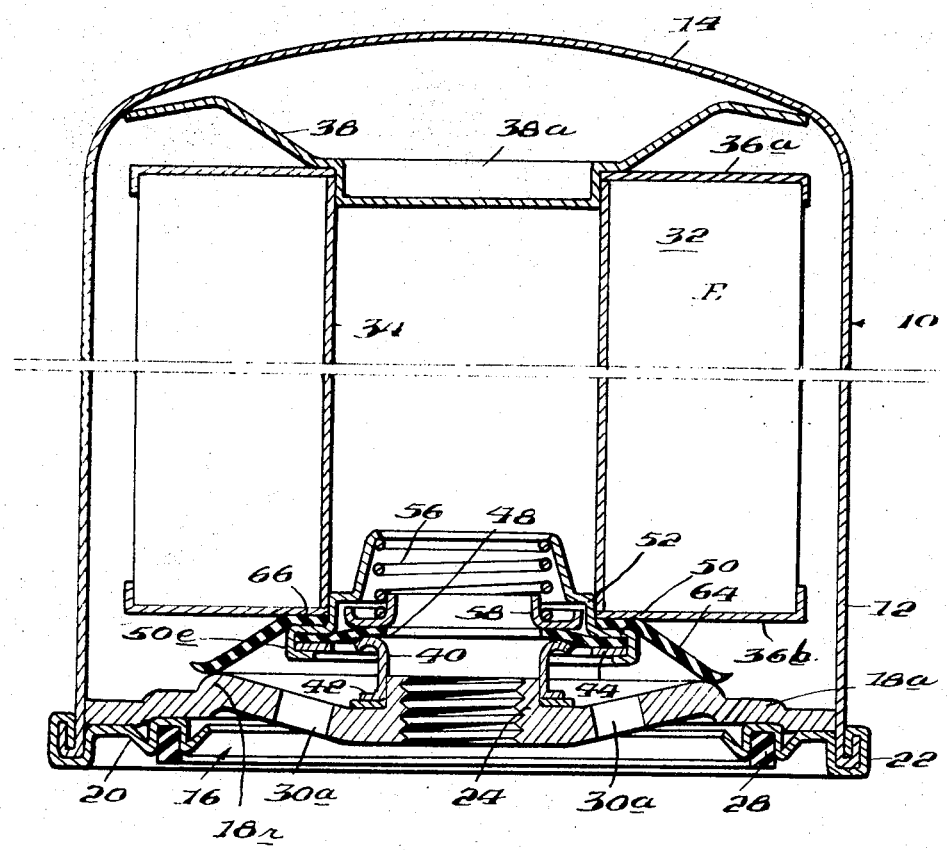
Figure 6:
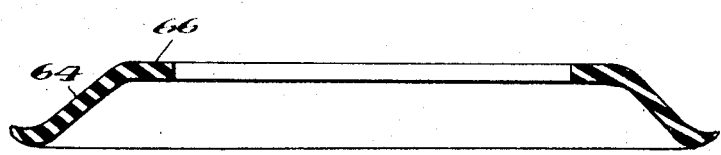
Figure 7:
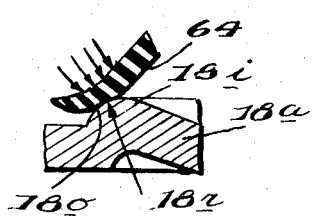

The above stated aims and objects of the invention, together with other more detailed objects which will appear as the disclosure proceeds, are realized by a filter construction now to be described in connection with the accompanying illustrative drawings, wherein:

FIG. 1 is a foreshortened vertical section taken through a filter according to the invention, which also illustrates in vertical section the improved front- or bottom-end bypass valve in operating position therein; and FIGS. 2, 3 and 4 are sectional and/or fragmentary views illustrating constructional details of said bypass valve; and FIG. 5 is a similar foreshortened vertical section taken through a somewhat modified form of filter characterized by a front- or bottom-end bypass valve similar to that illustrated in the FIGS. 1–4 inclusive filter form, and which additionally incorporates an improved anti-drainback valve arrangement as herein proposed; and FIGS. 6 and 7 are sectional and/or detail views, respectively, which illustrate the truncated upright cone shaping of the anti-drainback valve element and the manner of its seating.

Referring to the drawings in detail, the filter generally designated 10 (FIGS. 1-4) is, with the exceptions to be hereinafter stated, of a known spin-on disposable or throwaway type, i.e. one whose filter element E is permanently encased within a filter hOusing which is closed at both ends and adapted to be mounted directly on the engine block by screwing same on to an appropriately threaded pipe-form nipple (not shown) projecting from said block and to be demounted by a simple spinning- or screwing-off operation when filter replacement appears necessary. More particularly, said filter 10 comprises a thin-wall, preferably sheet-metal, shell or can 12 shown to be closed at its upper (distal from its mounting) end by an integral dome-shaped end wall 14 and at its initially open bottom end by a closure-plate assembly generally designated 16 comprising a heavy-gauge annular base plate 18 having a planar outer or rim portion whose diameter is substantially that of the inner diameter of the filter can and which is secured to the lower open-end edge portion thereof, illustratively by a separately formed, annular sheet-metal seaming cover 20 which may, as is conventional, be spot-welded to the under (outer) face of said base plate and is further lock-seamed along its outer periphery as at 22 to said lower end-edge portion of said shell to extend radially inwardly therefrom.

The annular base plate 18 is provided with a central opening defined by an axially-inturned tubular neck 24 whose bore is screw-threaded. Such enables the filter 10 as a whole to be mounted in operating position directly on the engine block (not shown) by screwing (spinning) same on to the afore-mentioned threaded nipple provided on said block and to be demounted by unscrewing same from said nipple. Also, as is conventional, the seaming cover 20 of the closure-plate assembly is provided adjacent its inner peripheral edge with a downwardly opening, full circular groove 26 in which is received a ring-form gasket 28 which is adapted sealingly to engage with an appropriately raised and flat mounting surface provided on the engine block upon said filter being spun on (threaded to) the block nipple to its full mounted position.

As is conventional, the heavy-gauge base plate 18 of the closure-plate assembly is provided in the generally planar portion thereof surrounding the inturned neck 24 with a plurality of through openings 30 which are preferably arranged in circumferentially spaced-apart relation. These openings are positioned radially inwardly of the inner edge of the seaming cover 20 and, as will be hereinafter explained, they provide oil inlet ports to the interior space of the closed filter housing.

Mounted coaxially within said filter housing and in the normal path of oil flow between said oil inlet ports 30 and the bore of the inturned base-plate neck 24, through which latter the filtered oil (and also any dirty oil which has bypassed the filter element when bypass is called for) returns to the engine oil line, is the aforementioned filter element E, with the detailed construction of which the invention is not concerned. Suffice it to say that said filter element is of the out-to-in flow type and comprises an annular body 32 of a suitable engine oil filtering material extending about a perforated core or center tube 34, which is closed at both ends by the imperforate end caps 36a, 36b to which the ends of the core or center tube are affixed.

The filter is also conventional in that its aforesaid filter element E has lesser overall diameter and axial length than does the closed ended filter housing, and also is bodily spring-biased relatively downwardly, i.e. towards the inner (upper) surface of the base plate 18, by a plate spring 38 reactive between the inner surface of the dome-shaped end closure 14 of the filter shell and the filter-element upper end cap 36a, it being noted that said spring 38 has a depressed center portion 38a which extends into and closes the upper end of the center tube 34, thereby to close off said upper end to oil flow therethrough in either direction. The filter element E is supported on an annular seat means (to be hereinafter described) which disposes it at an elevation within the filter housing as provides a space between its bottom end cap 36b and the inner surface of the base 18, through which oil entering the housing through the oil inlet ports or openings 30 under the pressure of the engine-driven oil pump will normally pass to the annular space between the inner surface of the filter shell and the filter element, thence inwardly through the filtering material of the annular body thereof to the center-tube bore, and thence axially-outwardly from the filter housing through communicating bores of the annular seat means and of the inturned neck 24 of said base plate.

The aforesaid annular seat means on which the filter element E is supported as aforesaid is a component of the improved front-end bypass unit with which the invention in one of its aspects is concerned and which will now be described in detail. Referring to FIG. 2, said unit comprises an adapter bushing 40 whose tubular body portion has internal diameter substantially equal to the outer diameter of the base-plate neck 24, and which is formed at its lower end with an outturned short-width foot flange 42 and at its upper end with a similarly outturned but much wider flange 44 having a plurality of circumferentially spaced oil bypass holes 46 punched, drilled or otherwise provided in its approximate-middle zone portion. Disposed in overlying position on the relatively upper surface of said flange 44 and hence in normal covering relation to said holes 46 is a planar valve annulus 48 of flexible rubber or rubber-like material, it being a feature of the invention that said valve annulus has radial width substantially equal to the radial width of the flange 44 and further that it is secured along only its outer edge or rim portion to the outer edge of said flange in manner as positively to prevent any oil leaking past or through the joint between the securing means and the outer edge of the adapter flange 44.

More particularly, said securement is provided by extending the outer edge portion of a radially outwardly projecting flange 50 formed on the lower end of a valve spring cup 52 over and then clinching it under the outer peripheral edge of the adapter flange 44. Since the outer edge or rim portion of the planar valve annulus 48 is disposed between said bent-over edge 52e of the flange 50 and the outer edge of the flange 44, the valve edge is securely and tightly clamped in oil-tight relation therebetween. The oil tightness of the resulting joint may be further improved by coining or otherwise fashioning a series of circular ribs separated by shallow grooves indicated at 44r in the upper plane surface of the adapter flange 44 to which the valve edge is clamped as aforesaid.

The body portion of the afore-mentioned spring cup 52 is tubular and its upper end is turned inwardly and fashioned as a spring-retaining seat 54 for the upper end of a coil-form valve spring 56 whose lower end is retained in a shallow concavity formed in the upper face of a spring-seating washer 58, which latter bears with spring pressure on the upper face of the unsecured inner-edge or zone portion of the valve annulus 48, thus normally maintaining the latter seated on the inner-edge portion of the adapter-flange upper face. To insure against such intended seating relationship being interrupted or impaired as by a large dirt particle, for example, becoming lodged between the rubber valve annulus and said adapter-flange face, the adapter flange 44, immediately adjacent its inner periphery, is formed with an upwardly convex bead 44b with which the rubber valve annulus makes substantially line contact rather than surface contact. It will be understood, of course, that it is almost a physical impossibility for a dirt particle to become or to stay lodged between a planar rubber annulus-type valve and an upwardly convex surface of a bead, rib or the like.

The front-end bypass valve unit of the invention will of course be made up to proper size to function effectively. That is to say, the internal diameter of the tubular adapter bushing 40 and the outer diameter of the spring cup body portion 52 will be respectively equal to the outer diameter of the inturned base plate neck 24 and the inner diameter of the center tube 34. Further, the radial outwardly projecting flange 50 of the spring-retaining cup 52 will have radial width, i.e. amount of projection, as to provide an effective annular seat for the filter element E. Further, the oil bypass holes will be provided in that intermediate radial zone portion of the upper flange 44 of the adapter bushing such that oil flow therethrough will not be impeded when called for, and the number and size of said holes will also be such as to accommodate for the full flow of oil therethrough should the filter become so clogged or plugged that no oil whatsoever can flow therethrough. Finally, the valve spring 56 will be one chosen to yield upon the pressure within the closed oil-filter housing approaching a value well under the pressure determined to be the bursting pressure thereof.

As clearly seen in FIG. 1, the filter therein illustrated incorporates anti-drainback valve means functioning to prevent oil which has entered the filter housing from draining back to the oil line upon operation of the engine-driven oil pump being interrupted. Such anti-drainback valve means takes the form of an annulus 62 of thin sheet rubber which is secured along its inner edge by the inter-positioning of said inner edge between the base-plate upper surface and the foot flange 42 of the adapter bushing. The outer-edge portion of the rubber annulus extends over and in covering relation with respect to the oil inlet opening 30. In theory, oil under the pressure developed by the engine-driven oil pump and which is effective on the under surface portions of the rubber annulus lying over the openings 30 will unseat, i.e. lift, said outer-edge portion to permit of oil flow to the filter element E, but should such pressure flow be stopped, the rubber annulus will close against said openings, thereby preventing back-flow or drainback of oil from filter to the oil line.

For reasons explained in the introductory portion of the present specification, the invention provides as a replacement for the just-described thin sheet rubber form of anti-drainback valve a much more efficient and practical form thereof now to be described in detail in connection with FIGS. 5–7 inclusive. More particularly, the improved anti-drainback valve element comprises a preform 64 of resilient rubber or rubber-like material which has somewhat shallow upright truncated-cone configuration and which is further provided along its smaller-diameter end with a short-length inwardly extending horizontal flange 66 whose edge defines a circle of diameter substantially equal to the outer diameter of the cylindrical body 52 of the valve spring cup of the bypass valve unit.

By reference to FIG. 5, said valve element 64 is secured in operating position simply by interposing its said inturned flange 66 between the bottom end cap 36b of the filter element E and the aforesaid annular seat means component of the front-end bypass valve unit 40–58, the spring bias in downward direction which the plate spring 38 exerts on the filter element and which is transmitted thereto to said filter element being adequate to secure the valve element in place.

For optimum functioning of the truncated-cone preform 64 as an anti-drainback valve in the filter under description, the base-plate of the closure-plate assembly of the filter in which said valve is used preferably has somewhat modified construction as compared to that of the base plate 18 shown in FIG. 1. More particularly, and as seen in FIGS. 5 and 7, the base plate 18a is shown to be formed with an axially inturned, full-circular hump or ridge 18r disposed radially outwardly of the circle of the oil inlet openings 30a and which hump or ridge is defined by radial-outer and radial-inner oppositely inclined slopes 18o, 18i meeting on a crest or ridge line. Further, the altitude and coning angle of the truncated cone-shaped preform is such that its larger-diameter end slightly overhangs the crest line of the hump or ridge 18r and also bears against its radial-outer slope 18c with sufficient pressure, as indicated by the series of arrows (FIG. 7) that it may be said to "hug" same throughout its full circumferential extent. Since the preform when properly mounted as described seals to the base plate only along an annular contact zone which is disposed radially outwardly of the circular or annular zone thereof in which the oil-inlet openings 30 are provided, it will be appreciated that there is no requirement for the inflowing oil, in order to bypass the filter element, of first having to unseat (lift) the outer-edge or skirt portion of said preform (valve 64) from out of sealing engagement with said annular contact zone. Accordingly, the anti-drainback valve element 64 of the invention is more sensitive in its action than the prior anti-drainback valves which must be unseated before any oil can flow to the front-end by-pass valve unit.

Without further analysis, it will be self-evident to those versed in the oil filter art that the present invention provides a front-end bypass valve unit which is novel in its overall concept of an annular valve element of flexible material (such as rubber) which is fixedly clamped along its outer periphery between corresponding outer peripheral or rim portions of superimposed metal flanges, provided one on the adapter bushing which supports the filter element from the base plate and centers it with respect to the base-plate neck, and the other on the spring-retainer cup member of the bypass valve unit, with said clamping of the flexible valve element as aforesaid providing an oil-tight joint not possible of attainment when metal-to-metal joints between corresponding flanges are used according to the prior art.

The invention also provides an anti-drainback valve element which is considered to be unique of itself and in the manner in which it combines both in the physical sense and functionally with the front-end bypass valve of the invention and which comprises a rubber preform having the general configuration of an upright truncated cone fixedly clamped along its smaller-diameter upper-end edge, in position such that its larger-diameter lower-end portion overhangs an annular ridge formation with which the base plate is provided and is further so sized as to exert a "hugging" force on said ridge formation. By virtue of said outer-edge portion of the rubber preform making sealing engagement with the base plate along a circular zone which is disposed outwardly of the circular zone of the base plate in which the oil-inlet openings are provided, the incoming oil may flow directly from said circular openings to the front-end bypass valve when bypass flow is called for, and thus the arrangement is such that when oil bypass is in order, there is no requirement for the incoming oil having to lift (effect unseating of) the outer-edge portion of the preform from the base plate prior to any oil flowing to the front-end bypass valve unit.

Having disclosed my invention in its various aspects, I claim:

1. A disposable spin-on type oil filter comprising:
a cylindrical closed-ended filter housing, one end closure of which comprises a heavy-gauge base plate provided in its central portion with an inturned tubular neck whose bore serves as an oil outlet passage, and radially outwardly therefrom with a plurality of through-holes serving as oil inlet openings;
a filter element enclosed within the housing and including an annular body of a suitable oil filtering material disposed about a perforated center tube;
a bypass valve unit interposed between said base plate and the filter element and supporting the latter spaced from the base-plate inner surface and with its center tube co-axial with and in fluid communication with the bore of said tubular neck;
said bypass valve unit normally establishing an oil flow path extending from said oil inlet openings to and thence radially inwardly through the annular body of filtering material to the center-tube bore and thence axially to and outwardly through the neck bore and being also effective to establish a bypass oil flow path extending substantially direct from said oil inlet openings to said center-tube and neck bores, said unit including a tubular adapter bushing closely encircling said tubular neck and having one end extending to said base plate and being provided at its other end with a radial outwardly extending flange of substantial width including inner, intermediate and outer radial-width portions, said intermediate radial-width portion having a plurality of circumferentially spaced-apart oil bypass openings formed therein and which are disposed on a circle such that they are adapted to open to the bore of the center tube, a generally planar valve annulus of flexible material having radial width substantially equal to the full radial width of said adapter-bushing flange and being disposed generally flush against the relatively upper face of said flange, and spring means reactive against at least the inner radial-width portion of said adapter-bushing flange and normally maintaining the corresponding inner radial-width portion of the valve annulus seated thereon as effects closing of said bypass openings to oil flow therethrough, said inner radial-width portion of the adapter bushing flange being so fashioned that said valve annulus normally seats thereon as aforesaid with line contact only, said spring means including an open-ended cylindrical spring-retaining cup whose body extends into and is closely fitted to the filter-element center tube and which terminates at its relatively lower end in a radial outwardly extending filter-element supporting flange whose outer-edge portion is bent overthe outer radial-width portions of both the valve annulus and the adapter-bushing flange and clinched tight against the relatively under face of the latter, thereby clamping the outer radial-width portion of said valve annulus to the corresponding outer radial-width portion of said adapter-bushing flange, the arrangement being such that said bypass valve unit provides an annular seat for the filter element and as a means for bypassing the incoming oil around the filter element in the event of oil pressure in the closed-ended housing exceeding the force which the spring means exerts on the inner-radial width portion of said valve annulus as aforesaid;
anti-drainback valve means secured in operative position within the filter housing by said bypass valve unit;
said anti-drainback valve means comprising a preform of rubber or rubber-like material having the configuration of a truncated cone which is clampingly secured along its smaller-diameter end to the bottom end of the filter element adjacent its center tube by said bypass valve unit and which extends relatively downwardly-outwardly therefrom over a substantial radial width portion of the base-plate inner surface and which encircles the inturned tubular neck and in which the oil-inlet openings are provided as aforesaid, said radial-width portion of the base plate being defined along its outer perimeter by a circular ridge-like formation, the larger-diameter end portion of the preform overhanging said circular ridge-like formation by a small radial amount and pressing thereagainst throughout its full circumference.

2. A disposable spin-on type oil filter according to claim 1, wherein the larger-diameter end of the perform has lesser effective diameter than that of the circular crest-line of said formation, whereby in overhanging the same as aforesaid the larger-diameter end portion "hugs" said formation.

3. A disposable spin-on type oil filter comprising:
a cylindrical closed-ended filter housing, one end closure of which comprises a heavy-gauge base plate provided in its central portion with an inturned tubular neck whose bore serves as an oil outlet passage, and radially outwardly therefrom with a plurality of through-holes serving as oil inlet oenings;
a filter element enclosed within the housing and including an annular body of a suitable oil filtering material disposed about a perforated center tube;
a bypass valve unit interposed between said base plate and the filter element and supporting the latter spaced from the base-plate inner surface and with its center tube co-axial with an in fluid communication with the bore of said tubular neck;
said bypass valve unit normally establishing an oil flow path extending from said oil inlet openings to and thence radially inwardly through the annular body of filtering material to the center-tube bore and thence axially to and outwardly through the neck bore and being also effective to establish a bypass oil flow path extending substantially direct from said oil inlet openings to said center-tube and neck bores;
anti-drainback valve means secured in operative position within the filter housing by said bypass valve unit;
said anti-drainback valve means comprising a preform of rubber or rubber-like material having the configuration of a truncated cone which is clampingly secured along its smaller-diameter end to the bottom end of the filter element adjacent its center tube by said bypass valve unit and which extends relatively downwardly-outwardly therefrom over a substantial radial-width portion of the base-plate inner surface and which encircles the inturned tubular neck and in which the oil-inlet openings are provided as aforesaid, said radial-width portion of the base plate being defined along its outer perimeter by a circular ridge-like formation, the larger-diameter end portion of the preform overhanging said circular ridge-like formation by a small radial amount and pressing thereagainst throughout its full circumference.

4. A disposable spin-on type oil filter according to claim 3, wherein the larger-diameter end of the perform has lesser effective diameter than that of the circular crest-line of said formation, whereby in overhanging the same as aforesaid the larger-diameter end portion "hugs" said formation.

* * * * *